Patented Sept. 9, 1947

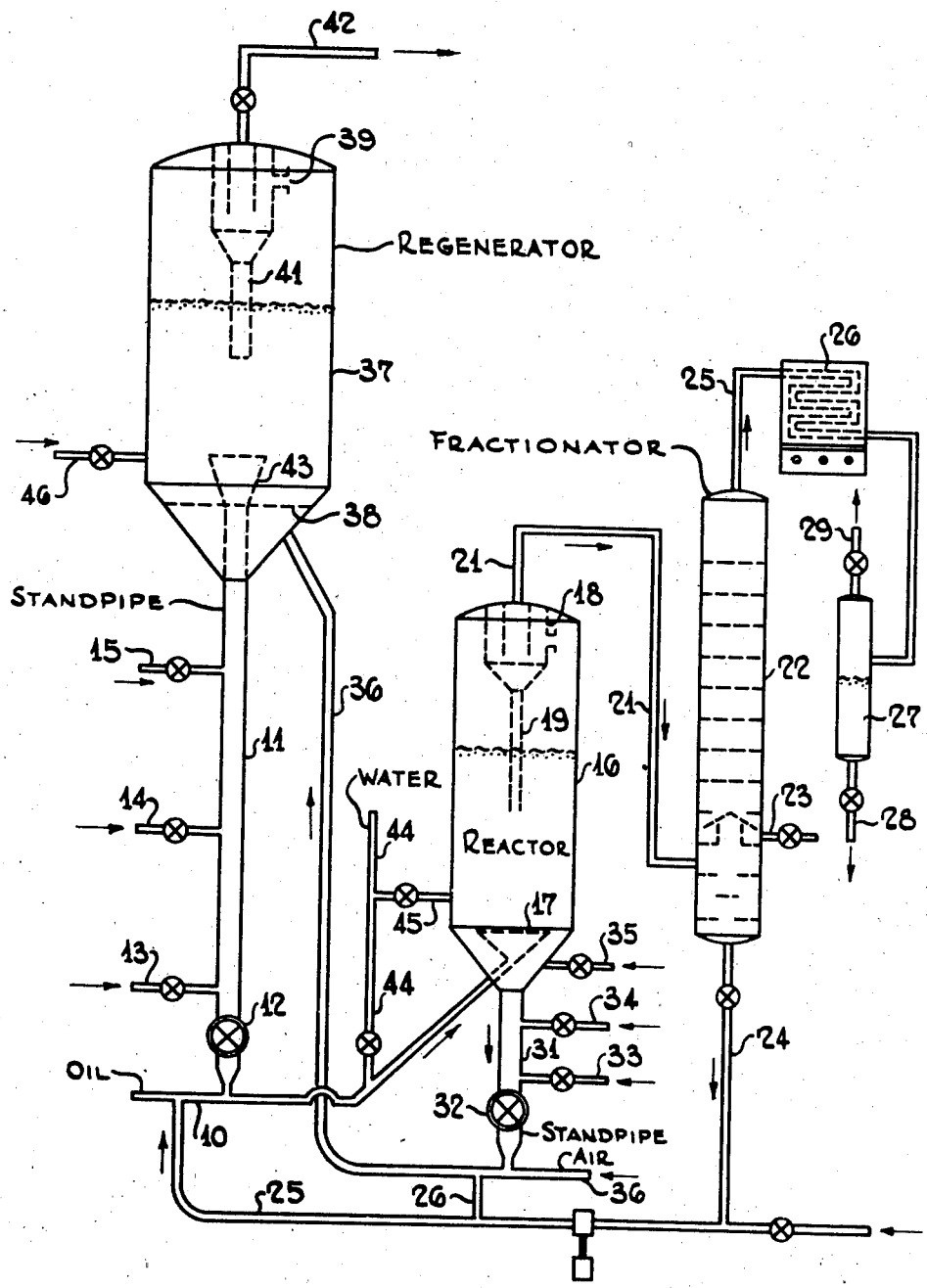

2,427,112

UNITED STATES PATENT OFFICE 2,427,112

CONVERSION OF HYDROCARBON OILS

Charles W. Tyson, Union, N. J., assignor to Standard Oil Development Company, a corporation of Delaware Application June 10, 1944, Serial No. 539,703

2 Claims. (Cl. 196—52)

This invention relates to the conversion of hydrocarbon oils and pertains more particularly to a continuous process for the conversion of such oils in which a conversion catalyst in subdivided form is continuously circulated through a conversion zone and a regenerating zone.

The invention finds particular application in self-contained processes for oil conversion in which a portion or all of the heat required for the conversion is obtained from the heat liberated during the regeneration or burning of combustible deposits formed on the catalyst during the conversion treatment.

It has heretofore been proposed to crack hydrocarbon oils in the presence of subdivided catalyst in which the catalyst is continuously circulated through the cracking and regenerating zones at a rate controlled so that the bulk of the heat liberated during regeneration is absorbed by the catalyst mass below deactivating temperature and is subsequently transferred to the oil to be cracked. Such a process has two important advantages. First, it eliminates the provision of tube stills or other heating furnaces for supplying heat to the oil necessary for the cracking operation. Second, it also avoids the necessity of providing coolers or other heat exchange equipment for removing the heat liberated during regeneration in order to prevent deactivation of the catalyst.

One of the limitations to such a process, however, is that when operating at constant conversion into distillate stocks the amount of coke formed may vary with the coke-forming characteristics of the feed and other operating conditions. In certain operations the amount of coke formed may be in excess of that required to supply the heat requirements for the conversion process. In such cases the excess heat liberated by the coke must be removed from the system in order to avoid deactivating the catalyst. While this can be done by providing suitable coolers in the regenerating zone or by recirculation of cooled catalyst to the zone, this tends to nullify one of the advantages of operating as above described. Furthermore, in some operations the amount of coke formed may be insufficient to supply the necessary heat requirements for the process and consequently additional heat from some source must be supplied to the oil.

The process, therefore, has definite limitations unless provision is made for extracting or adding heat to the system.

One of the principal objects of the present invention is to provide a more simple and effective method for removing excess heat from the process of the type above described.

A further object of the invention is to provide a more simple and effective method of controlling the temperature of a self-contained conversion process in which subdivided catalyst is continuously circulated through the conversion and regenerating zones.

Other more specific objects and advantages of the invention will be apparent from the description hereinafter in which reference will be made to the accompanying drawing which is a diagrammatic illustration of an apparatus for the cracking of hydrocarbon oils in which the invention finds particular application.

Referring to the drawing, the reference character 10 designates an oil line into which the oil to be charged is introduced into the system. This oil may be at room temperature or it may be preheated by suitable heat exchange with hot products of the process. The oil passing through line 10 is intermixed with hot, finely divided, regenerated cracking catalyst introduced through standpipe or column 11 by means of a control valve 12 which regulates the amount of catalyst intermixed with the oil. The catalyst in the column 11 is maintained in a fluidized state by the introduction of an aerating or fluidizing gas at one or more spaced points through lines 13, 14 and 15. The catalyst so introduced may be any of the known catalysts capable of effecting the desired results. Among such catalysts may be mentioned activated clay, synthetic gels comprising silica-alumina, silica-zirconia, alumina-boria, silica-magnesia, or combinations thereof. The catalyst is preferably in a finely divided state having a particle size, for example, below about 100 mesh, although coarser materials may be utilized if desired. The amount of catalyst introduced into the oil is controlled to maintain the desired heat balance in the system, as later described.

The catalyst so introduced is substantially at regeneration temperature, which may be at a temperature between 1000° F. and 1200° F. or more, depending upon the characteristics of the catalyst, and the amount of catalyst so introduced is at least sufficient to preheat the oil to the desired cracking temperature and supply the necessary heat of cracking and may be in excess of that required for supplying the required heat, as later described.

The suspension or mixture of oil and catalyst formed in the line 10 is passed into reaction chamber 16 through a distributing cone 17 having a perforated grid at the upper surface for distributing the suspension in the reaction zone. The size of the reactor is designed to cause the velocity of the gases and vapors introduced into the reaction chamber to be reduced to such a point as to permit the finely divided catalyst to segregate into a relatively dense body in the bottom portion of the reaction chamber. When employing a catalyst of the type above described, the velocity of the gases passing upwardly through the reaction chamber may be of the order of 0.5 to 3.0 feet per second. The term "superficial velocity" as herein employed means the linear velocity which the gases would assume if no finely divided material were present in the reactor. The oil vapors pass upwardly through the layer or body of turbulent catalyst material in the bottom section of the chamber 16 and the time of residence of the oil vapors with the catalyst is controlled to obtain the desired conversion. This conversion may, for example, range from 50% to 100% as measured by the amount of material boiling outside the boiling range of the feed formed during the process. This may be readily determined by subtracting the amount of cycle oil having the same boiling range as the feed from 100. The conversion products after passing through the layer of catalytic material in the chamber 16 may be passed to a cyclone separator 18 which may be mounted in the upper section of the chamber 16 as illustrated, or it may be supported outside the reaction chamber.

Catalyst particles entrained in the cracked vapors removed from the separator 18 are returned to the reactor through line 19. The reaction chamber 16 is preferably constructed of such height that the layer of catalytic material contained therein is at a substantial distance below the outlet as illustrated so as to reduce the amount of entrained powder carried overhead with the conversion products. Expressed in another way, the level of catalytic material within the reaction chamber 16 may be controlled by the rate of withdrawal, as hereinafter described, to hold the upper surface a substantial distance below the upper end of the reaction chamber.

The conversion products after passing through the cyclone separator 18 are removed through line 21 and may be passed to a conventional fractionating tower 22 in which insufficiently cracked constituents may be condensed. The initial condensate formed in the bottom section of the fractionating tower may be maintained segregated from the lower boiling condensate by the provision of a trap-out tray 23 positioned above the inlet for the cracked vapors. The initial condensate formed in the bottom section of the tower will contain any entrained catalyst powder carried overhead from the separator 18. This condensate together with entrained powder may be withdrawn from the fractionating tower 22 through line 24 and may be returned to the reaction chamber through line 25 or passed to the regenerating chamber through line 26, as later described. Condensate formed in the upper section of the fractionating tower 22 may be withdrawn from the trap-out tray 23 as a product of the process.

Vapors remaining uncondensed in the fractionating tower 22 are removed overhead through line 25 leading to a condenser 26 in which the desired distillate is condensed. Products from the condenser 26 pass into a product receiver 27 in which the liquid distillate separates from uncondensed vapors and gases. The liquid distillate is withdrawn from the receiver 27 through line 28 as a final product of the process and may be subjected to any further finishing treatment desired to produce the final market product. Gases and vapors separated from the liquid distillate in the receiver 27 are removed overhead through line 29 and may be passed to any suitable gas absorption equipment for recovery.

Returning again to the reaction chamber 16, the distributing cone 17 through which the catalyst and oil are introduced into the system is preferably spaced from the outer walls of the chamber to form an annular space through which the catalyst is removed from the reactor. The lower end of the chamber 16 communicates with a vertical standpipe 31 having a control valve 32 for controlling the rate of withdrawal of the catalytic material from the reaction chamber. The time of residence of the catalyst in the reactor is controlled so that the amount of combustible deposits formed relative to the amount of catalyst is insufficient to heat the catalyst above the deactivating temperature thereof.

An aerating or fluidizing gas may be introduced into the standpipe 31 through one or more spaced points through lines 33, 34 and 35. The catalyst removed from the reaction chamber 16 through vertical conduit 31 is discharged into a stream of air passing through line 36 and is transferred into the bottom portion of regenerator 37. The regenerator 37 may be provided with a conical bottom portion have a perforated grid 38 through which the suspension of air and catalyst passes into the main body of the regenerator. The zone beneath the perforated grid 38 may serve to distribute the air and catalyst more uniformly throughout the regenerator, although in some operations the grid may be eliminated. The regenerator 37 is also preferably designed of such diameter that the velocity of the air stream passing into the regenartor is reduced to such a point that the catalyst is allowed to segregate into a relatively dense layer in the bottom section. This layer is maintained in a turbulent condition by the upward passage of the combustion gases therethrough.

The spent combustion gases after passing through the layer of catalytic material undergoing regeneration in regenerator 37 may be passed into a cyclone separator 39 or other suitable separating device for removing entrained catalyst from the spent regeneration gas. The catalyst so separated is returned to the generator through line 41 and the spent combustion gas is removed from the regenerator through line 42. This gas may be subjected to further treatment for removing the final traces of entrained catalyst and may be passed to suitable heat recovery means such as a waste heat boiler for extracting the heat therefrom. Regenerated catalyst is withdrawn from the regenerator 37 through the standpipe or conduit 11 which has an enlarged internal extension 43 projecting above the perforated grid 38.

The pressure necessary for effecting the circulation of the catalytic material through the cracking and regenerating zones as above described is generated in standpipes 11 and 31. These standpipes are of such height as to develop a pressure therein sufficient to overcome the pressure drop in the other portions of the circulating equipment. The above is a more or less general description of the fluid type of cracking process in which the catalyst in finely divided, fluidized state is caused to circulate continuously through the cracking and regenerating zones by the operation of gravitational forces.

The present invention is concerned with a method of removing excess heat liberated during the regeneration over and above that necessary to supply the desired heat for the cracking process.

In accordance with the present invention, there is injected into the circulating catalyst a quenching medium having a relatively high heat of vaporization, such as water. This quenching medium may be introduced at one or more spaced points in the circulating stream, but it is preferred to inject the quenching medium either into the reactor or into the suspension of oil vapors and catalyst leading to the reactor. This quenching medium may, for example, be introduced through line 44 into line 10 which carries the oil and catalyst into the reactor. As an alternative, a part or all of the quenching medium may be introduced directly into the reactor through lines 44 and 45. If desired, additional quenching medium may be introduced into the regenerator through line 46. However, many types of cracking catalysts are steam sensitive in that they tend to become deactivated in the presence of steam at high temperatures and in an oxidizing atmosphere. By injecting the water into the reactor or into the oil stream, there is therefore less tendency of deactivating the catalyst. Furthermore, in most cracking operations the velocity of the oil vapors through the reactor is lower than the velocity of the regeneration gas passing through the regenerator, so that there is less tendency for the water vapors to increase the velocity of the gases passing through the reactor above the critical point which might tend to carry the catalyst overhead with the oil vapors. The present invention, therefore, provides a simple and effective method of extracting excess heat liberated during regeneration without the necessity of providing coolers or other heat exchangers which would increase the cost of the equipment.

Having described the preferred embodiment of the invention, it will be understood that it embraces such other variations and modifications as come within the spirit and scope thereof.

What is desired to be protected by Letters Patent is:

1. In a catalytic process for the conversion of hydrocarbon oils in which solid conversion catalyst in subdivided form is continuously recirculated through a conversion zone wherein combustible carbonaceous deposits are formed on the catalyst and thereafter through a regeneration zone in which the combustible deposits are burned and wherein the amount of heat generated by the burning of said combustible deposits is more than sufficient to supply the heat required for the conversion; the method of removing excess heat formed during burning of said combustible deposits which comprises intermixing hot, regenerated catalyst with hydrocarbons to be converted while said catalyst is substantially at regeneration temperature and in an amount more than sufficient to supply the heat required for the conversion, and thereafter injecting a vaporizable cooling liquid into the intermixture of hydrocarbons and catalyst in an amount sufficient to absorb the excess heat but insufficient to reduce the temperature below conversion temperature.

2. In a catalytic process for the conversion of hydrocarbon oils in which solid conversion catalyst in subdivided form is continuously recirculated through a conversion zone wherein combustible carbonaceous deposits are formed on the catalyst and thereafter through a regeneration zone in which the combustible deposits are burned and wherein the amount of heat generated by the burning of said combustible deposits is more than sufficient to supply the heat required for the conversion; the method of removing excess heat formed during burning of said combustible deposits which comprises intermixing hot, regenerated catalyst with hydrocarbons to be converted while said catalyst is substantially at regeneration temperature and in an amount more than sufficient to supply the heat required for the conversion, and thereafter injecting water into the intermixture of hydrocarbons and catalyst in an amount sufficient to absorb the excess heat.

CHARLES W. TYSON.

REFERENCES CITED

The following references are of record in the file of this patent:

UNITED STATES PATENTS

| Number | Name | Date |
| --- | --- | --- |
| 2,247,097 | Menshih | June 24, 1941 |
| 2,289,329 | Prickett | July 7, 1942 |
| 2,309,034 | Barr | Jan. 19, 1943 |
| 2,356,680 | Marancik et al. | Aug. 22, 1944 |
| 1,799,858 | Miller | Apr. 7, 1931 |
| 2,231,231 | Subkow | Feb. 11, 1941 |
| 2,237,339 | DeFlorez | Apr. 8, 1941 |
| 2,348,646 | Reeves | May 9, 1944 |
| 2,356,697 | Rial | Aug. 22, 1944 |
| 2,360,622 | Roetheli | Oct. 17, 1944 |
| 2,341,193 | Scheineman | Feb. 8, 1944 |
| 2,347,682 | Gunness | May 2, 1944 |
| 2,367,351 | Hemminger | Jan. 16, 1945 |
| 2,369,523 | Belchetz | Feb. 13, 1945 |
| 2,374,660 | Belchetz et al. | May 1, 1945 |
| 2,379,408 | Arveson | July 3, 1945 |
| 2,379,966 | Johnson | July 10, 1945 |
| 2,380,760 | Huff | July 31, 1945 |
| 2,385,446 | Jewell et al. | Sept. 25, 1945 |
| 2,366,805 | Richker | Jan. 9, 1945 |

FOREIGN PATENTS

| Number | Country | Date |
| --- | --- | --- |
| 118,399 | Australia | Apr. 12, 1944 |